US008868408B2

(12) United States Patent
Spears

(10) Patent No.: US 8,868,408 B2
(45) Date of Patent: Oct. 21, 2014

(54) SYSTEMS AND METHODS FOR WORD OFFENSIVENESS PROCESSING USING AGGREGATED OFFENSIVE WORD FILTERS

(71) Applicant: IPAR, LLC, San Francisco, CA (US)

(72) Inventor: Joseph L. Spears, Hayward, CA (US)

(73) Assignee: IPAR, LLC, San Francisco, CA (US)

( * ) Notice: Subject to any disclaimer, the term of this patent is extended or adjusted under 35 U.S.C. 154(b) by 0 days.

(21) Appl. No.: 13/940,375

(22) Filed: Jul. 12, 2013

(65) Prior Publication Data
US 2013/0304456 A1    Nov. 14, 2013

Related U.S. Application Data

(63) Continuation of application No. 12/696,978, filed on Jan. 29, 2010, now Pat. No. 8,510,098.

(51) Int. Cl.
G06F 17/20 (2006.01)
G06F 17/28 (2006.01)
G06F 17/21 (2006.01)
G10L 21/00 (2013.01)
G06F 17/30 (2006.01)

(52) U.S. Cl.
CPC .......... *G06F 17/28* (2013.01); *G06F 17/30867* (2013.01)
USPC .......... 704/9; 704/1; 704/4; 704/10; 704/270; 704/270.1; 704/275

(58) Field of Classification Search
USPC ...................... 704/1, 4, 9, 10, 270, 270.1, 275
See application file for complete search history.

(56) References Cited

U.S. PATENT DOCUMENTS

| 5,438,511 | A | * | 8/1995 | Maxwell et al. .................. 704/1 |
| 5,796,948 | A | | 8/1998 | Cohen |
| 6,161,130 | A | | 12/2000 | Horvitz et al. |
| 6,199,034 | B1 | | 3/2001 | Wical |
| 6,279,017 | B1 | * | 8/2001 | Walker ......................... 715/201 |
| 6,389,472 | B1 | | 5/2002 | Hughes et al. |
| 6,721,734 | B1 | * | 4/2004 | Subasic et al. ....................... 1/1 |

(Continued)

FOREIGN PATENT DOCUMENTS

EP    1040660 B1    5/2003

OTHER PUBLICATIONS

Sirisanyalak, Burim, Sornil, Ohm; Artificial Immunity-Based Feature Extraction for Spam Detection; 8th ACIS International Conference on Software Engineering, Artificial Intelligence, Networking, and Parallel/Distributed Computing; Piscataway, NJ; pp. 359-364; 2007.

(Continued)

Primary Examiner — Edgar Guerra-Erazo
(74) Attorney, Agent, or Firm — Jones Day

(57) ABSTRACT

Computer-implemented systems and methods are provided for identifying language that would be considered obscene or otherwise offensive to a user or proprietor of a system. A first plurality of offensive words are received, and a second plurality of offensive words are received. A string of words are received, where one or more detected offensive words are selected from the string of words that matches words from the first plurality of offensive words or the second plurality of offensive words. The string of words is processed based upon the detection of offensive words in the string of words.

35 Claims, 14 Drawing Sheets

(56) References Cited

U.S. PATENT DOCUMENTS

| | | | |
|---|---|---|---|
| 6,782,510 | B1 | 8/2004 | Gross et al. |
| 6,963,830 | B1 * | 11/2005 | Nakao .................. 704/1 |
| 7,020,607 | B2 * | 3/2006 | Adachi ................ 704/257 |
| 7,058,566 | B2 * | 6/2006 | Shaw ................... 704/9 |
| 7,260,519 | B2 * | 8/2007 | Polanyi et al. ........... 704/9 |
| 7,356,463 | B1 * | 4/2008 | Isabelle ................ 704/9 |
| 7,369,985 | B2 * | 5/2008 | Polanyi et al. ........... 704/8 |
| 7,386,442 | B2 * | 6/2008 | Dehlinger et al. ........ 704/10 |
| 7,424,420 | B2 * | 9/2008 | Polanyi et al. ........... 704/8 |
| 7,437,290 | B2 | 10/2008 | Danieli |
| 7,594,277 | B2 | 9/2009 | Zhang et al. |
| 7,653,621 | B2 | 1/2010 | Senthil |
| 7,664,343 | B2 | 2/2010 | Withum et al. |
| 7,739,289 | B2 | 6/2010 | McAllister et al. |
| 7,853,445 | B2 * | 12/2010 | Bachenko et al. ......... 704/9 |
| 7,991,609 | B2 | 8/2011 | Brockett et al. |
| 2002/0007371 | A1 | 1/2002 | Bray |
| 2002/0013692 | A1 | 1/2002 | Chandhok et al. |
| 2002/0116629 | A1 | 8/2002 | Bantz et al. |
| 2003/0212541 | A1 | 11/2003 | Kinder |
| 2003/0212546 | A1 * | 11/2003 | Shaw ................... 704/9 |
| 2004/0003283 | A1 | 1/2004 | Goodman et al. |
| 2004/0107089 | A1 | 6/2004 | Gross et al. |
| 2004/0210442 | A1 | 10/2004 | Glynn et al. |
| 2005/0060140 | A1 | 3/2005 | Maddox |
| 2005/0060643 | A1 | 3/2005 | Glass et al. |
| 2005/0097174 | A1 | 5/2005 | Daniell |
| 2006/0259543 | A1 | 11/2006 | Tindall |
| 2007/0294077 | A1 | 12/2007 | Narayanan et al. |
| 2008/0134282 | A1 | 6/2008 | Fridman et al. |
| 2008/0162540 | A1 | 7/2008 | Parikh et al. |
| 2009/0306969 | A1 | 12/2009 | Goud et al. |
| 2009/0313706 | A1 | 12/2009 | Zhang et al. |
| 2011/0087485 | A1 | 4/2011 | Maude et al. |

OTHER PUBLICATIONS

International Search Report and Written Opinion of the International Searching Authority; PCT/US2011/022889; Apr. 2011.

International Search Report and Written Opinion of the International Searching Authority; PCT/US2011/022911; Apr. 2011.

* cited by examiner

402

| WORD | SEVERITY SCORE |
|---|---|
| WORD_1 | 8 |
| WORD_2 | 5 |
| WORD_3 | 10 |
| WORD_4 | 2 |
| WORD_5 | 7 |
| WORD_6 | 8 |
| WORD_7 | 4 |

OFFENSIVE WORD LIST

| WORD | UNDERSTOOD SEVERITY SCORE |
|---|---|
| WORD_1 | (1) |
| WORD_2 | (1) |
| WORD_3 | (1) |
| WORD_4 | (1) |
| WORD_5 | (1) |
| WORD_6 | (1) |
| WORD_7 | (1) |

OFFENSIVE WORD LIST

SYSTEMS AND METHODS FOR WORD OFFENSIVENESS PROCESSING USING AGGREGATED OFFENSIVE WORD FILTERS

CROSS-REFERENCE TO RELATED APPLICATIONS

This patent application is a continuation of U.S. patent application Ser. No. 12/696,978, filed Jan. 29, 2010, and entitled "Systems and Methods for Word Offensiveness Processing Using Aggregated Offensive Word Filters," the entirety of which is herein incorporated by reference.

TECHNICAL FIELD

The present disclosure relates generally to computer-implemented systems and methods for identifying language that would be considered offensive to a user or proprietor of a system.

BACKGROUND

Obscenity (in Latin, obscenus, meaning "foul, repulsive, detestable") is a term that is most often used to describe expressions (words, phrases, images, actions) that offend. The definition of obscenity differs from culture to culture, between communities within a single culture, and also between individuals within those communities.

Many cultures have produced laws to define what is considered to be obscene or otherwise offensive, and censorship is often used to try to suppress or control materials that fall under these definitions. Various countries have different standings on the types of materials that they, as legal bodies, permit their citizens to have access to and disseminate among their local populations. These countries' permissible content vary widely, with some having extreme punishment for members who violate the restrictions. However, while accessing these types of contents may result in punishment in one society, the content may be perfectly acceptable in another

SUMMARY

In accordance with the teachings provided herein, systems and methods for identifying language that would be considered obscene or otherwise offensive to a user or proprietor of a system are provided. For example, a system and method can be configured to receive, using one or more processors, a first plurality of offensive words and a second plurality of offensive words. A string of words may be received. The string of words is then compared to the first and second plurality of offensive words in order to determine if the string of words contains an offender word. The string of words is then processed based on the determination of the presence of an offender word based on the string of words.

A system and method may further be configured to associated a severity value with the offensive words which may then be used in conjunction with a offensiveness threshold value or function to determine if the string of words contain an offender word. A system and method may have as the source for the pluralities of offensive words, severity values and offensiveness thresholds any of a user, a service administrator, a third party, a government institution having jurisdictional authority for a user, a non-governmental institution with which the user is associated or any combination thereof.

A system and method may be configured so that a string of words may be modified by deleting the string of words such that the string of words is not displayed to the user or by censoring the string of words such that the offender word is not displayed. A system and method may also be configured so that a string of words may be rejected. A system and method may be configured so that some strings of words are rejected and others are modified based on an offensive word's membership to the first or second plurality of offensive words or the severity score of the offensive word as configured in either plurality.

As another example, computer-implemented systems and methods may include receiving a plurality of offensive words and receiving a second plurality of offensive words. A string of words may be received, where one or more detected offensive words are selected from the string of words that matches words from the plurality of offensive words or the second plurality of offensive words. The string of words may be processed based upon the detection of offensive words in the string of words.

BRIEF DESCRIPTION OF THE DRAWINGS

FIGS. 4A and 4B depict example offensive word lists.

FIG. 13 depicts an example user interface wherein an offensive word identifier may be utilized as an output filter.

DETAILED DESCRIPTION

Figure 1:
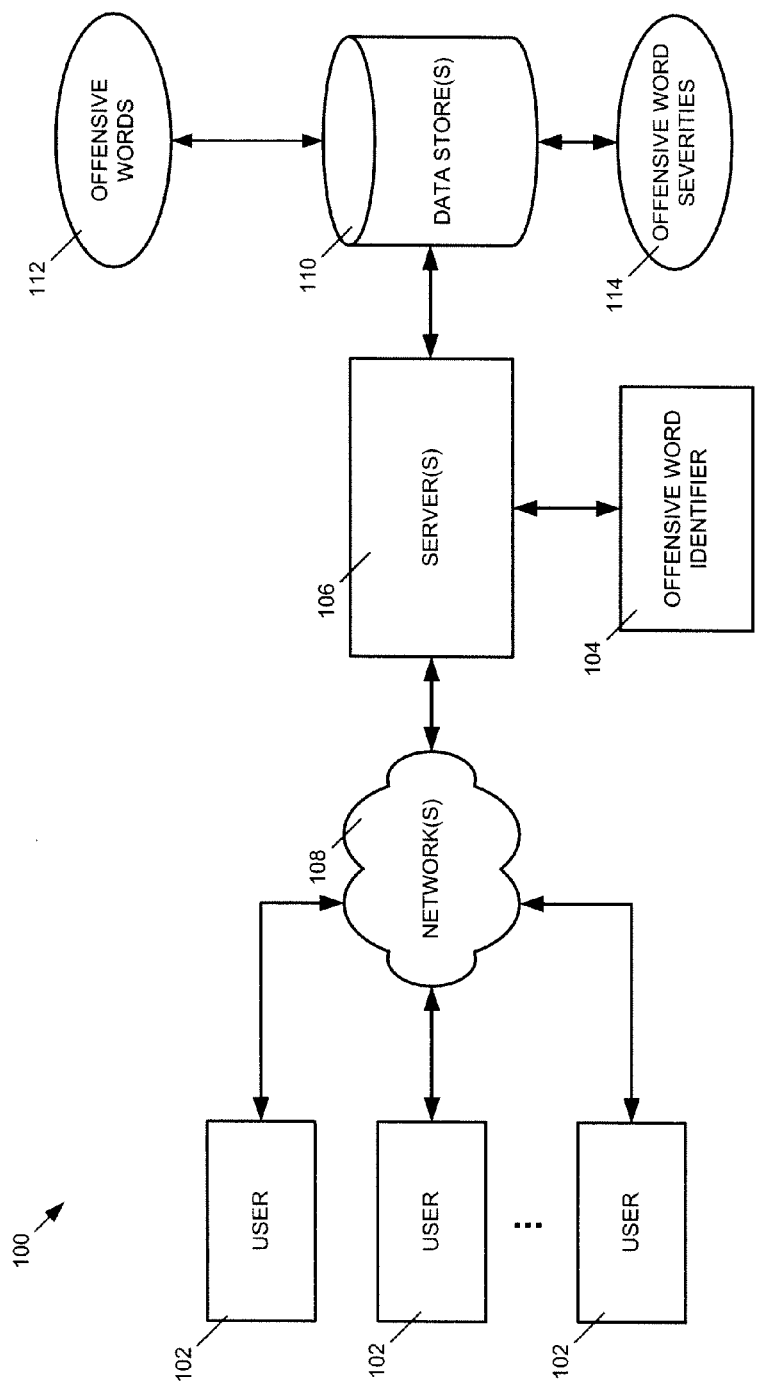
FIG. 1 depicts a computer-implemented environment where users can interact with an offensive word identifier.

FIG. 1 depicts a computer-implemented environment where users 102 can interact with an offensive word identifier 104. The offensive word identifier 104 provides a framework for mitigating language that is considered offensive by a reader or by a provider of a media forum. The content management system may be utilized in a variety of scenarios. For example, a message board operator may configure an offensiveness threshold for his message board. User message board posts may be parsed, with the words of the posts scrutinized against the offensiveness threshold, and posts that contain one or more terms that surpass the offensiveness threshold may be refused, modified to mitigate the offensiveness (e.g., the use of symbols may be used to sensor the offensive term: ####, @%^#, etc.), or otherwise mitigated.

In another example, a user of a system, such as a message board may configure an offensiveness threshold representing his personal sensitivity to offensive language. Content in message board postings that the user requests to view may then be scrutinized prior to the user being presented with the posts. Posts containing one or more terms that surpass the user's offensiveness threshold may be hidden from the user, a warning may be presented including a link for the user to view the post that includes offensive language, or the post may be modified to mitigate the offensiveness, such as through the use of symbols to censor the objectionable terms. In a further example, an offensive word identifier 104 may be utilized on both input to and output from a system.

For example, in an online service that enables the posting of content reviews, such as reviews of newly released movies, the site proprietor may set one or more offensiveness thresholds to be applied (e.g., to user posts to the content review service). For example, the site proprietor may set a very low threshold for terms to be considered offensive in reviews for categories of movies containing themes appropriate for children (e.g., G-rated movies), while a higher offensiveness threshold may be set for categories of movies that include more adult themes (e.g., R-rated movies). Category offensiveness thresholds may then be applied to user reviews, where posts containing terms deemed offensive for that category may be refused or otherwise mitigated.

The input filters at the content review service may work in conjunction with one or more additional individual user offensiveness filter. Individual users may identify a personalized offensiveness threshold for their viewing experience. The text of content reviews to be presented to the user may then be scrutinized prior to the user being presented with the reviews. Posts containing one or more terms that surpass the user's offensiveness threshold may be hidden from the user or otherwise mitigated.

An offensiveness word identifier may be utilized in a number of other contexts as well. For example, on a social networking site, a user may be able to set an offensiveness threshold for terms in posts to their own "walls," while also setting a personal offensiveness threshold to be applied to content from the social networking site that is presented to the user. In another example, in a public library, a general public patron's offensiveness threshold may be set to a low threshold, while a librarian may be permitted to set a looser filter via a less restrictive threshold. In a further example, in a massively multiplayer online role playing game (MMORPG), game designers may set a particular tolerance for users to be able to 'verbalize' during game play experience. Language more offensive than that default tolerance will be rejected by an input filter. Players (or parents of players) of the game may also set a particular tolerance for language such that language that makes it 'into the game' may be prevented from being displayed on the player's screen.

The offensive word identifier 104 may also be used to accommodate regional offensiveness standards. For example, some countries with low thresholds for offensive language may prevent citizens from accessing sites on which a crawler finds offensive language. A lower offensiveness threshold may be set for accessers, including crawlers, from those countries so as to not raise offensiveness objections that might result in site prohibition in that country. Users from that country may then be permitted to set a personal threshold lower than the national maximum but not higher. In other configurations, the national offensiveness threshold may be a default user offensiveness threshold, but users may be permitted to adjust their personal threshold higher or lower, as they desire.

The offensive word identifier 104 may also be utilized in offline content. For example, newsletter subscribers may have their personal, paper copies of the newsletter filtered according to their user offensiveness threshold at print time. Similarly, digital books may be delivered to or displayed on a user's device according to the user's personal offensiveness threshold. The offensive word identifier 104 may also be in other environments, such as a text-to-speech implementation. For example, language in a book being digitally spoken via text-to-speech technology may be deleted or modified to prevent the digital speech of words that surpass a user's offensiveness threshold.

An offensive word identifier 104 may increase capability and flexibility of content portals and media by allowing proprietors and/or users to filter offensive language to maintain content standards and to provide content that meets the offensiveness tolerance of a content user. The content management system 104 contains software operations or routines for identifying offender words in a string of words. Users 102 can interact with the offensive word identifier 104 through a number of ways, such as over one or more networks 108. One or more servers 106 accessible through the network(s) 108 can host the offensive word identifier 104. The one or more servers 106 are responsive to one or more data stores 110 for providing data to the offensive word identifier 104. Among the data contained in the one or more data stores 110 may be a collection of offensive words 112 and offensive word severities 114 that facilitate the identification of offender words (e.g., as part of a string of words).

Figure 2:
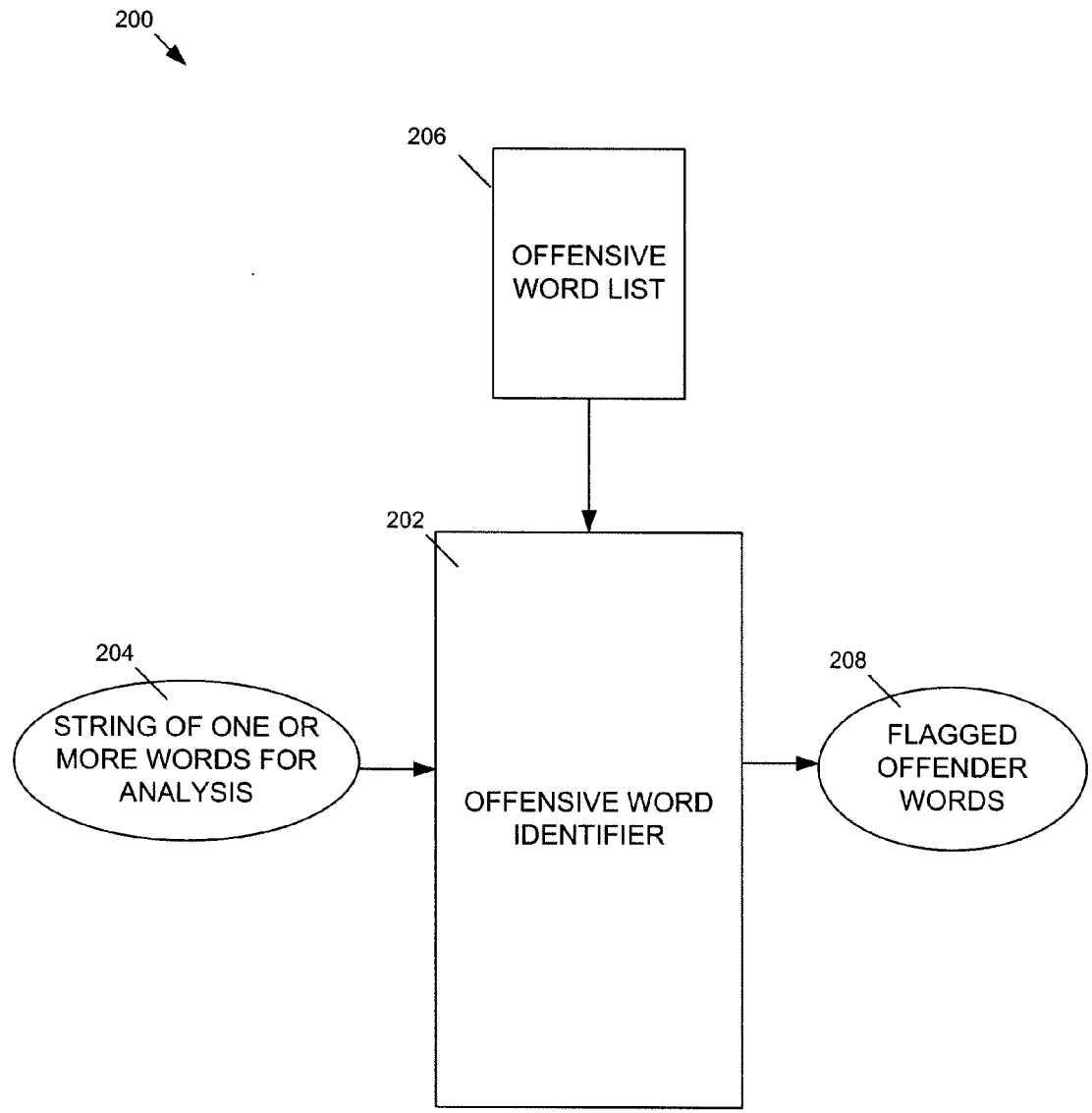
FIG. 2 is a block diagram depicting an offensive word identifier for identifying offensive words in a string of words.

FIG. 2 is a block diagram depicting an offensive word identifier 202 for identifying offensive words in a string of words. A string of one or more words 204 for analysis is provided as input to the offensive word identifier 202. The offensive word identifier 202 is also responsive to an offensive word list 206 containing a list of words against which the string of one or more words 204 is to be compared. Based on the string of words 204 for analysis and the offensive word list 206, the offensive word identifier 202 flags any offender words 208 in the string of one or more words 204 for analysis that are considered likely to be offensive.

For example, using a collection of offensive words (e.g., profanity, obscenity, hate-speech, lewdness, sacrilege, blasphemy, subversive etc.) as an offensive word list 206, which have various "severity" scores assigned to them, the offensive word identifier 202 may determine a distance from a candidate word (in the string of one or more words 204) to a word on the offensive word list 206, to identify "how different from a bad word" a word in the string of one or more words 204 is. That difference from a bad word may be used in conjunction with the severity score for the "bad" word, to generate an offensiveness score for the candidate word. If the highest offensiveness score generated in comparing the candidate word to multiple words on the offensive word list 206 is greater than an offensiveness threshold, then the candidate word may be deemed an offender word (e.g., likely offensive to the threshold setter). Such an offensive word identifier 202 may prevent many attempts to circumvent the offensive word identifier 202 through minor adjustments to offensive words (e.g., inserting minor misspellings, utilizing punctuation that looks similar to letters, inserting spaces or punctuation between letters).

Figure 3:
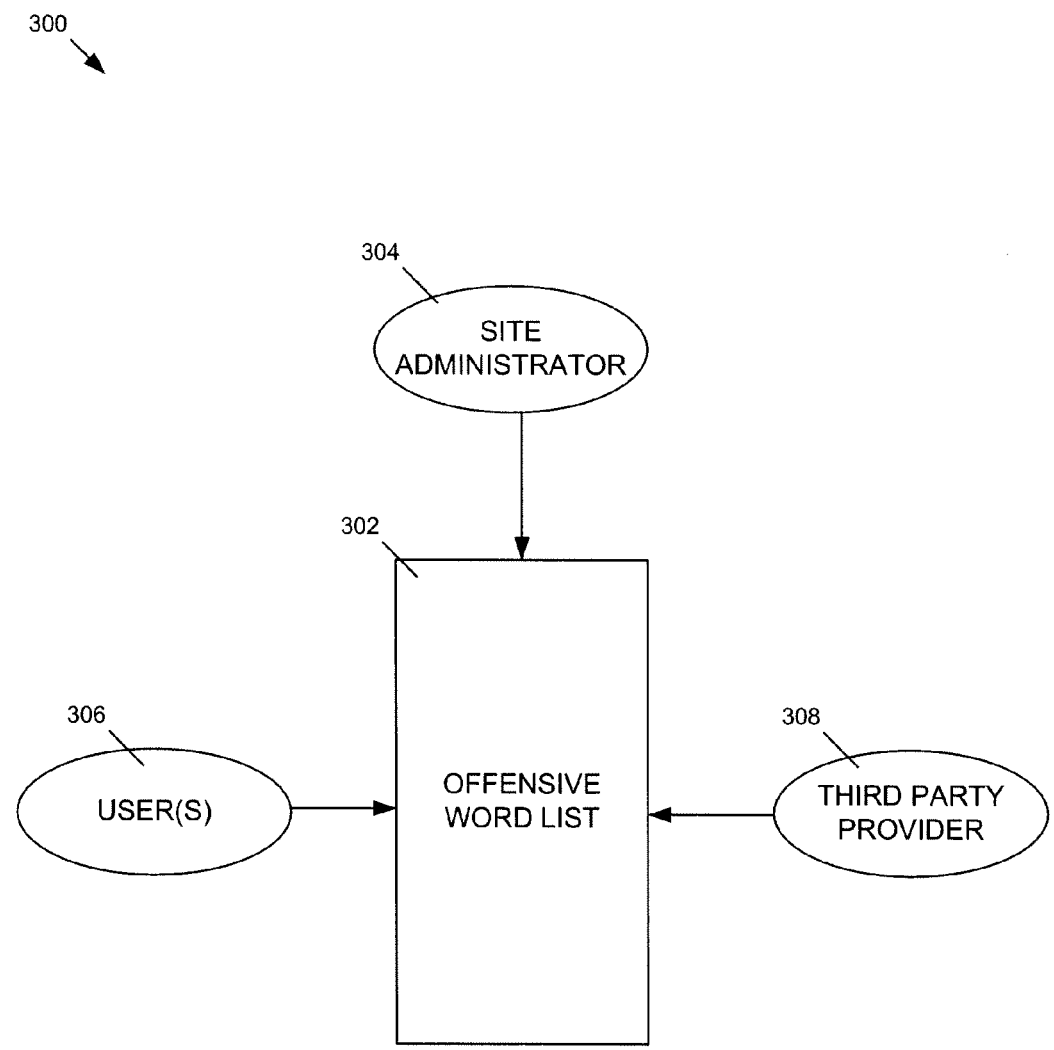
FIG. 3 is a block diagram depicting example sources of an offensive word list or contributions to words on an offensive word list.

The contents of an offensive word list can come from a variety of sources. FIG. 3 is a block diagram depicting example sources of an offensive word list 302 or contributions to words on an offensive word list 302. For example, an offensive word list 302 may be generated by a site administrator 304. The site administrator 304 (or other control personnel to whom the site administrator 304 delegates such responsibility) may identify a list of words that he deems offensive (e.g., that should not be permitted to appear on his site), and utilize that list of words as an offensive word list 302 either alone or in conjunction with an offensive word identifier. An offensive word list 302 may also be generated by a user 306 who is to be presented content. The user 306 may identify words that he does not wish to read while viewing the content, and those identified words may be presented to an offensive word identifier as an offensive word list 302. The offensive word list 302 may also be provided by a third-party (e.g., someone other than a site administrator 304 or a user 306). The third party may identify a collection of words that are often deemed offensive. Such a list of words may be provided to an offensive word identifier as an offensive word list 302. An offensive word list 302 may also be generated by a collaborative effort of site administrators 304, users 306, third party providers, and/or others for use with an offensive word identifier. For example, the site administrator may present a 'default' list of words that individual users can customize for their own purposes. In another example, users can share the list of offensive words. In another example, an offensive word list 302 may be created based upon a user's similarity to another group of users for which an offensive word list has been defined.

FIGS. 4A and 4B depict example offensive word lists. In the example of FIG. 4A the offensive word list 402 includes a collection of words deemed offensive along with a severity score associate with each of the words in the offensive word list 402. The offensive word list 402 may, for example, be stored as a table in a relational database. The severity score may be an indication of how offensive a word is. For example, certain words of four-letters in length are considered more offensive than other terms that some consider offensive. The severity score represents how offensive these words are in comparison to other words. In an implementation that would be relevant for mainstream American culture, the "F-Word" could have the highest score in the database while the word "Tienneman" may not be present in that particular database. In another example for an example that may be relevant for certain communities of Asian culture, the word "Tienneman" would have a very high rating while the "F-Word" may not be present in that particular database.

FIG. 4B depicts an offensive word list 404 that does not include a severity score for the words on the list. Each word on the offensive word list 404 may be considered globally offensive. In determining an offensiveness score for the words on the offensive word list 404 of FIG. 4B each of the words on the list may be understood to have an equal severity score, such as 1, and thresholds applied to words being analyzed may be adjusted accordingly.

In addition, either example database may optionally contain a set of transformation functions that allow the system to match variations of the word to its variants. In the case that the database does not contain such transformation functions, a set of transformation functions can optionally be determined dynamically. One example of a transformational function would be a regular expression that treats the character '@' as the character 'a'.

Figure 5:
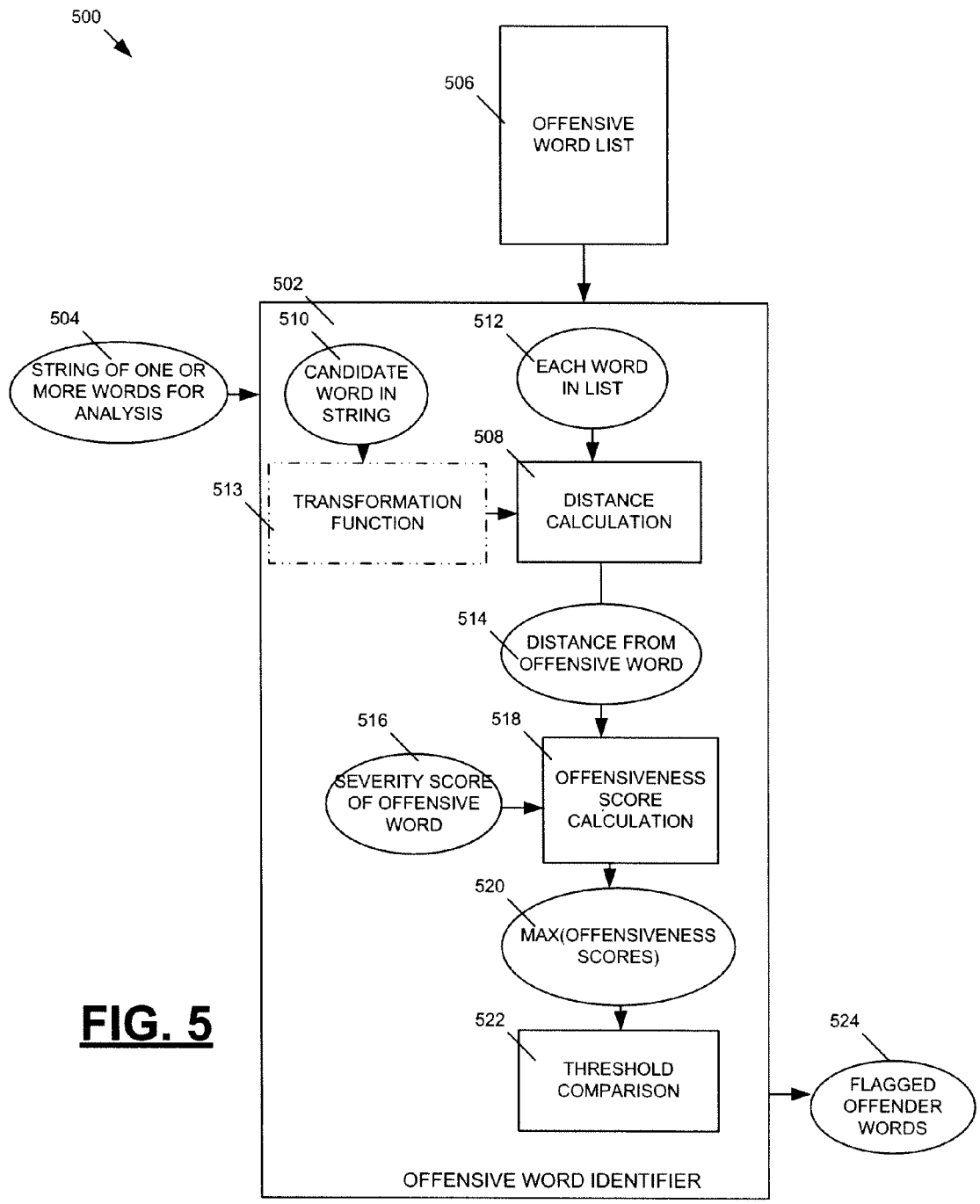
FIG. 5 is a block diagram depicting selected details of an example offensive word identifier.

FIG. 5 is a block diagram depicting selected details of an example offensive word identifier 502. The offensive word identifier 502 receives a string of one or more words 504 for analysis as well as an offensive word list 506. Candidate words may be identified from a string of one or more words for analysis 504 in a variety of ways. For example, tokens of characters between spaces or punctuations may be identified as candidate words or phrases for analysis by an offensive word identifier 502. Additionally, spaces and punctuations may be removed from a string of words 504 for analysis, and groups of different lengths of the remaining characters may be provided to the offensive word identifier 502 as candidate words 510, shifting one character to the right in the string of one or more words 504 after a number of lengths of candidate words have been provided as candidate words 510 at the current position in the string of one or more words 504. A transformation function 513 may be applied to a candidate word 510 to identify alternative candidate words that may be hidden in the string of one or more words 504. For example, all "@" symbols in a candidate word may be transformed to "a"s based on their similar appearance. A distance calculation 508 is then performed between a candidate word 510 (or transformed candidate word) in the string of words 504 for analysis and each word 512 in the offensive word list 506.

For example, the distance calculation may utilize a Levenshtein distance calculation. A Levenshtein distance may be implemented by the following code:

```
private double compute WordDistance(String s, String t) {
    int n = s.length( );
    int m = t.length( );
    if (n == 0) {
        return m;
    }
    if (m == 0) {
        return n;
    }
    int[ ][ ] d = new int[n + 1][m + 1];
    for (int i = 0; i <= n; d[i][0] = i++) {
        ;
    }
    for (int j = 1; j <= m; d[0][j] = j++) {
        ;
    }
    for (int i = 1; i <= n; i++) {
        char sc = s.charAt(i-1);
        for (int j = 1; j <= m; j++) {
            int v = d[i-1][j-1];
            if (t.charAt(j-1) != sc) {
                v++;
            }
            d[i][j] =
                Math.min(
                    Math.min(d[i-1][j]+1, d[i][j-1]+1),
                    v
                );
        }
    }
    return d[n][m];
}
```

As an example, assume the word merde is associated with a severity score of ten. Using an offensive word list alone, the words m.e.r.d.e and m3rcl3 may be missed if those variants of the word do not appear in the offensive word list 506. However, to include all variants of every potentially offensive word, the offensive word list 506 would need to be extremely large. In some implementations, a shorter offensive word list 506 can be maintained if a distance calculation 508 is utilized. In these implementations, filler text, such as spaces and punctuation, may be removed from candidate text prior to executing a distance calculation. In other implementations, an optional transformation function can be used to mark the letters at the beginning and end of the string as the boundaries for a possible 'offensive word' match. In each of these implementations, a distance calculation, such as the function noted above, may then be executed. Inputting the offensive word list member merde and the candidate word m3rcl3 into the above function returns a value of 4, based on four transformations being necessary to transform m3rcl3 to merde (e.g., "3" to "e", "c" to "d", "1" is removed and "3" to "e").

In some implementations, other distance calculation processes may also be implemented as the distance calculation 508. For example, the distance calculation 508 may be a Hamming Distance, a Damerau-Levenshtein Distance, a Dice coefficient, a Jaro-Winkler distance, or other measurement.

The distance calculation 508 can output a distance 514 of the candidate word 510 in the string of words 504 from a word 512 in the offensive word list 506. The distance 514 from the offensive word and the severity score 516 for the offensive word are input into an offensiveness score calculation 518 that outputs an offensiveness score for the candidate word based upon one word in the offensive word list 506. The distance calculation 508 and the offensiveness score calculation 518 may be repeated to identify an offensiveness score for the candidate word 510 for each word in the offensive word list 506. The maximum offensiveness score 520 calculated for the candidate word 510 is compared to an offensiveness threshold at 522. If the maximum offensiveness score 520 identifies the candidate word 510 as being more offensive than the offensiveness threshold, then the candidate word 510 is flagged as being an offender word 524. While an offender word is often referred to herein as having an offensiveness score greater than an offensiveness threshold, it is understood that some embodiments may identify a candidate word as an offender word where the offensiveness score for the candidate word is less than an offensiveness threshold value.

An offensiveness threshold is representative of a person's sensitivity to sensitive language, wherein if a word's offensiveness score exceeds an offensiveness threshold, then that word is likely to be considered offensive by the person with which the offensiveness threshold is associated. Alternatively, words that do not exceed an offensiveness threshold are likely not offensive to a person with which the offensiveness threshold is associated. For example, if a user has a tolerance for "moderate swearing," the direct presentation of one of these most offensive four-letter words would be flagged by the offensive word identifier. One example would be the use of a particular four letter word, beginning with the letter T, in mainstream American culture. In this example, if the word "frick" is input to the system instead, while the "idea" behind the word is still a strong severity word, the word distance from the actual four-letter word is far, thus the word "frick" may not be identified as an offender word. Additionally, for a user that has a preference for zero swearing, the word "frick" would have a score that is above the user offensive word tolerance and would be flagged as an offender word.

Figure 6:
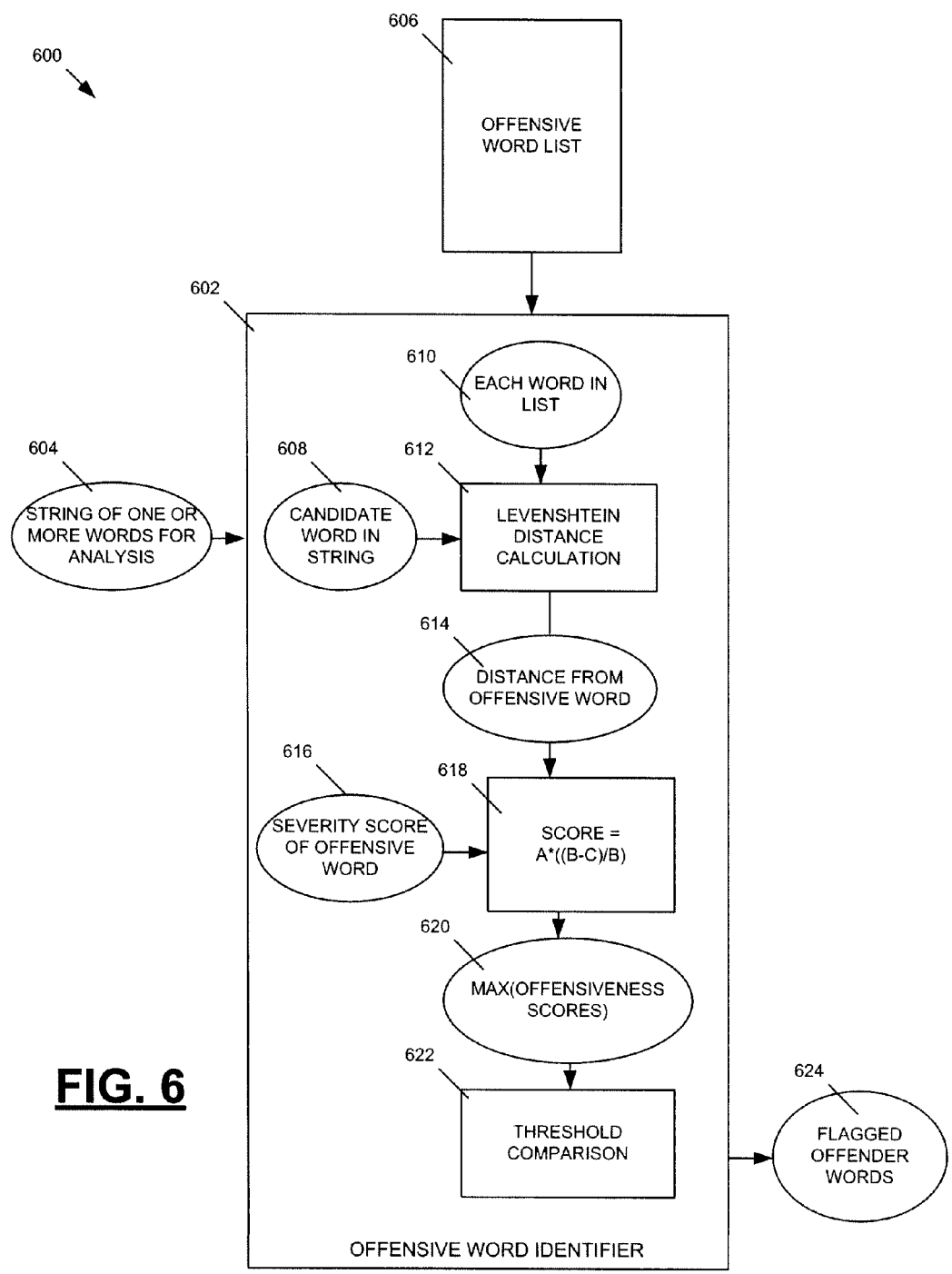
FIG. 6 is a block diagram depicting an offensive word identifier that utilizes a Levenshtein distance calculation.

FIG. 6 is a block diagram depicting an offensive word identifier 602 that utilizes a Levenshtein distance calculation. The offensive word identifier 602 receives a string of one or more words 604 for analysis and is also responsive to an offensive word list 606. The offensive word identifier 602 compares a candidate word 608 in the string of words 604 to each word 610 in the offensive word list 606 using a Levenshtein distance calculation 612. The calculated distance from the current offensive word along with the severity score 616 of the current offensive word are inputs to an offensiveness score calculation 618. For example, an offensiveness score may be calculated as:

$$\text{Score} = A*((B-C)/B),$$

where A is the severity score for the current offensive word 610 in the offensive word list 606, B is the length of the offensive word 610, and C is the calculated distance 614 between the candidate word 608 and the current offensive word 610.

For example, in the above example where the word merde had a severity score of 10 and a length of 5, and the calculated Levenshtein distance between merde and m3rcl3 is 4, the above formula is populated as follows:

$$\text{Score} = 10*((5-4)/5) = 2.$$

The maximum offensiveness score 620 obtained via comparisons and calculations utilizing the candidate word 608 and each of the words 610 in the offensive word list 606 is compared to a threshold value at 622 to determine if the candidate word 608 is to be flagged as an offender word 624. Thus, if the word, merde, scored the highest offensiveness score of 2 for the string, m3rcl3, then the offensive word identifier 602 would flag the string, m3rcl3, as being an offender word if the offensive threshold being applied is less than (or, in some embodiments, equal to) 2. Thresholds may be set to range between the lowest and highest severity scores found in the offensive word list 606 (e.g., from 0 to 10) or to other values outside of that range. Using a scale of 0 to 10, an offensiveness threshold of 3 may be set by a person who has a low tolerance for offensive language, while a person having a higher tolerance may use an offensiveness threshold of 8. Variations in thresholds utilized may vary according to severity scores used (or the lack of the use of severity scores), the offensiveness score calculation method utilized, as well as other factors Other offensiveness score calculations may be utilized by an offensive word identifier 602. For example, if a similarity metric, such as a Jaro-Winkler distance or Sørensen similarity index is used instead of a distance metric in the distance calculation, then an offensiveness score calculation may be calculated according to an inverse distance calculation (using a safe assumption of a non-zero value for the word similarity):

$$\text{Score} = A*((B-(1/C))/B),$$

where A is the severity score for an offensive word in the plurality of offensive words, where B is a function of a length of the offensive word (where that function could be the length of the offensive word itself), and where C is the calculated distance between the candidate word and the offensive word.

For example, in the above example where the word merde had a severity score of 10 and a length of 5, and the calculated Sørensen similarity index between merde and m3rcl3 is approximately 0.44, the above formula is populated as follows:

$$\text{Score} = 10*((5-(1/0.44))/5) = 4.5 \text{ (rounded to one significant digit)}.$$

In this example as in the previous example, the range of possible calculated values is unbounded since the value of the word severity is unbounded, but the site administrator can define an appropriate scale that accounts for the site's particular needs. It must be noted that although this algorithm requires a non-zero value for the similarity score, this is a practical restriction as a candidate word or phrase would conditionally have some similarity to the root offensive word in order to trigger the analysis in the first place.

An offensiveness score calculation may also be performed such that a score is not normalized with the length of the word from the offensive word list 606 as:

$$\text{Score} = \text{Max}(((A-C)/A), 0)$$

For example, in the above example where the word merde had a severity score of 10 and a length of 5 and the calculated Levenshtein distance between merde and m3rcl3 is 4, the formula is populated as follows:

$$\text{Score} = \text{Max}(((10-4)/10), 0) = \text{Max}((6/10), 0) = 0.6$$

In this example, the value of the particular calculation based on the example underlying algorithms will always be in the range of [0.1] and so the threshold scale should accommodate this range.

As a further example, in a scenario where the offensive word list 606 does not include a severity score with each entry or where each entry has the same severity score, the offensiveness threshold may be adjusted (e.g., the offensiveness threshold may be set between 0 and 1 if all words in the offensive word list 606 are considered to have a severity of 1), such that a word is flagged according to:

$$\text{'offensive'} = (((B-C)/B) > T),$$

where T is the offensiveness threshold.

For example, in the above example where the word merde appears in the word database and has a length of 5 and the calculated Levenshtein distance between merde and m3rcl3 is 4, the formula is populated as follows $$((5-4)/5) = 0.2$$

In this example, any threshold which defines a word as offensive in the event the score is equal to or greater than 0.2 would mark the word m3rcl3 as offensive. Again, the value of the particular calculation based on the example underlying algorithms will always be in the range of [0 ... 1] and so the threshold scale should accommodate this range.

Figure 7:
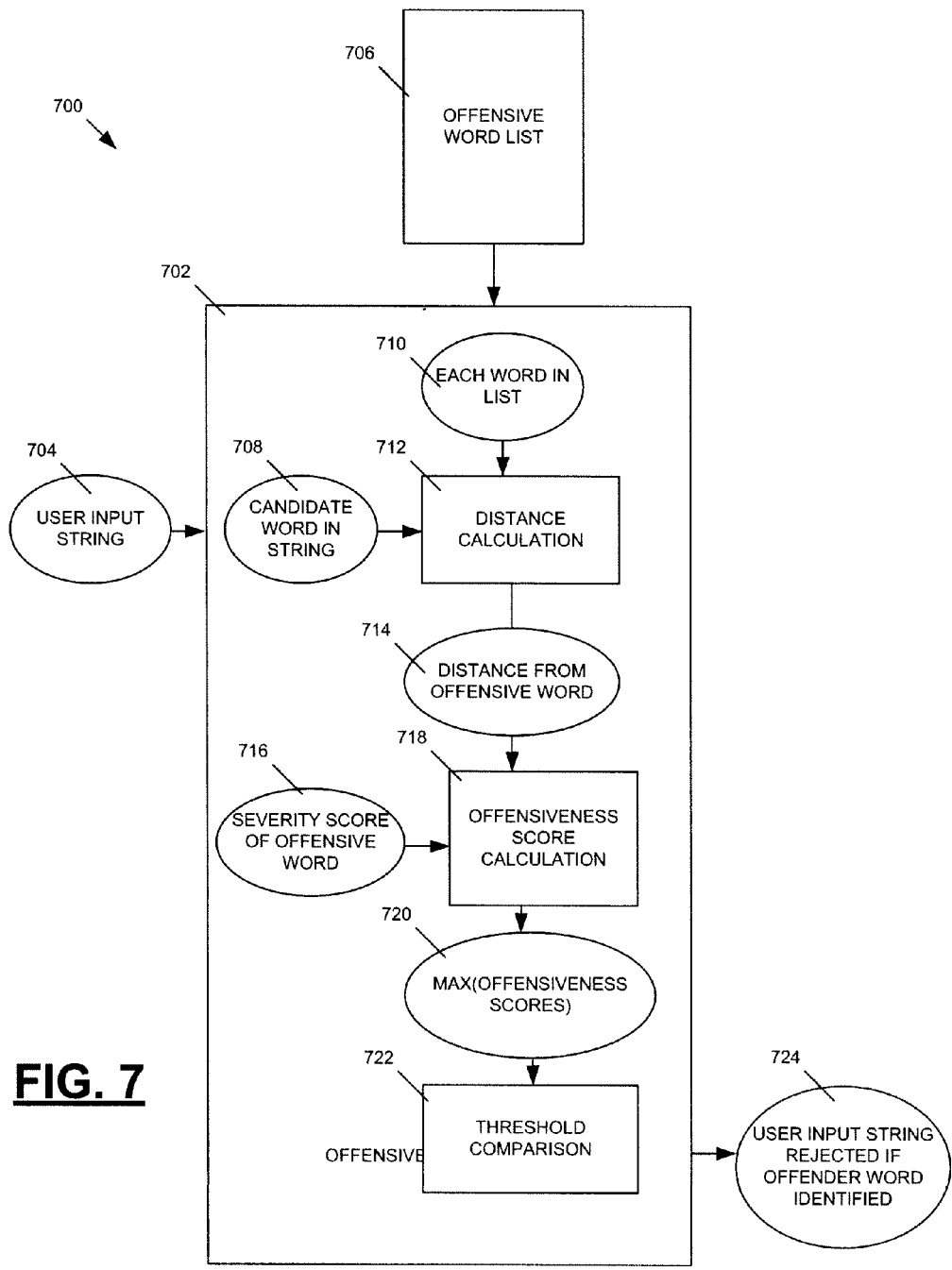
FIG. 7 is a block diagram depicting an offensive word identifier being utilized as an input filter.

FIG. 7 is a block diagram depicting an offensive word identifier 702 being utilized as an input filter. The offensive word filter 702 receives a user input string 704. For example, the user input string 704 may be a submitted post to a message board. The offensive word identifier 702 is also responsive to an offensive word list 706. A candidate word 708 in the user input string 704 is compared to a word 710 in the offensive word list 706 via a distance calculation 712. The distance of the candidate word 708 from the word 710 in the offensive word list 706 is output at 714, which becomes an input, along with the severity score 716 of the current word 710 from the offensive word list 706 to an offensiveness score calculation 718. The maximum offensiveness score 720 calculated at 718, is based upon comparisons of the candidate word 708 and each word 710 in the offensive word list 706. The maximum offensiveness score 720 is compared to an offensiveness threshold at 722. User input 704 (e.g., a word in the user input string 704), may be rejected at 724 if a word in the user input string 704 is identified as an offender word (e.g., exceeds the maximum offensiveness score 720).

Figure 8:
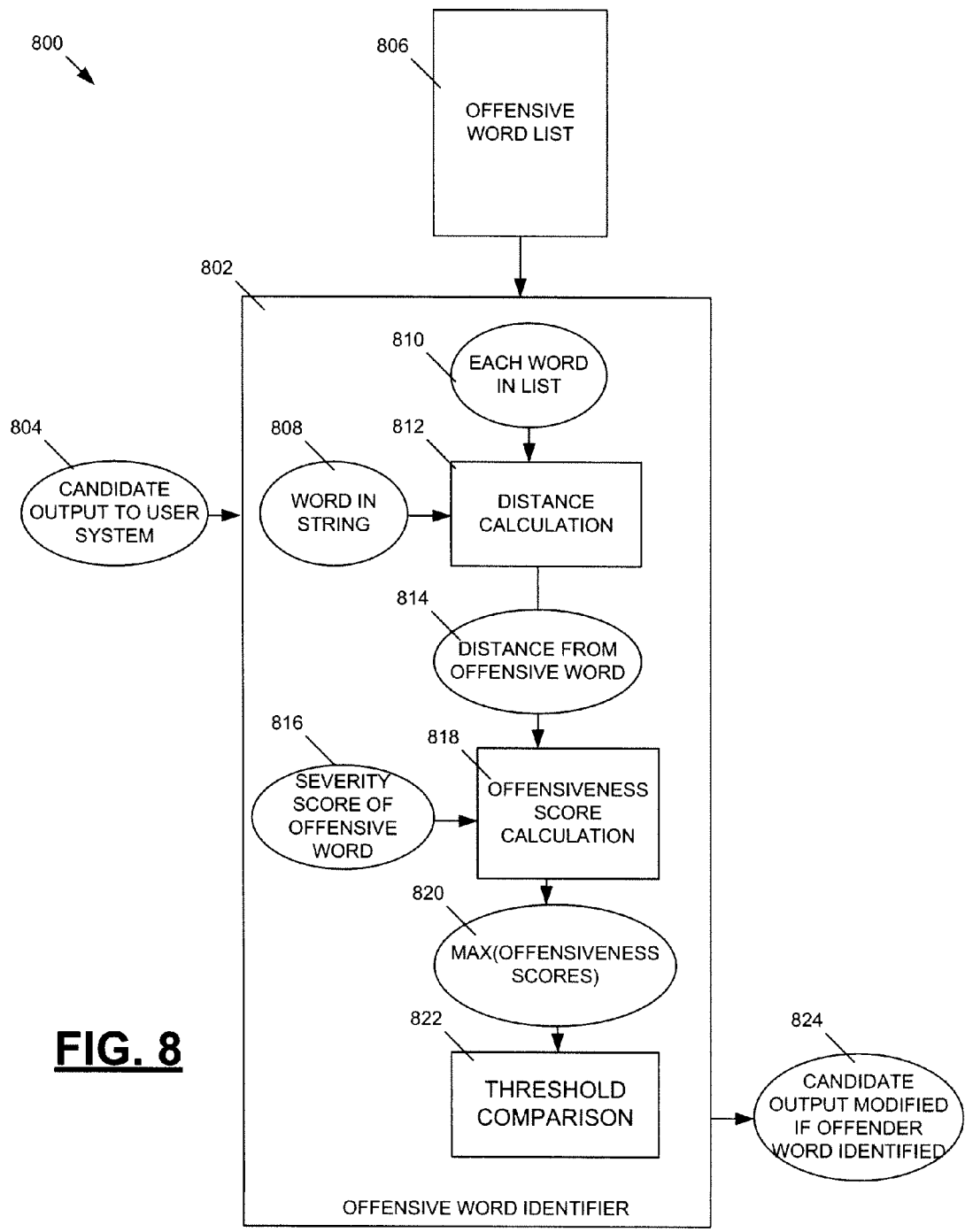
FIG. 8 is a block diagram depicting an offensive word identifier being utilized as an output filter.

FIG. 8 is a block diagram depicting an offensive word identifier 802 being utilized as an output filter. The offensive word filter 802 receives a candidate output to a user system 804. For example, the candidate output to the user system 804 may be a message board post requested by a user for display. The offensive word identifier 802 is also responsive to an offensive word list 806. A candidate word 808 in the candidate output to a user system 804 is compared to a word 810 in the offensive word list 806 via a distance calculation 812. The distance of the candidate word 808 from the word 810 in the offensive word list 806 is output at 814. This output is then input, along with the severity score 816 of the current word 810 from the offensive word list 806, to an offensiveness score calculation 818. The maximum offensiveness score 820 calculated at 818, is based upon comparisons of the candidate word 808 and each word 810 in the offensive word list 806. The maximum offensiveness score 820 is compared to an offensiveness threshold at 822. Candidate output to the user system 804 may be modified at 824 (e.g., such as via the use of symbols to censor an offender word), if a word in the candidate output to a user system 804 is identified as an offender word (e.g., exceeds an offensiveness threshold 822).

Figure 9:
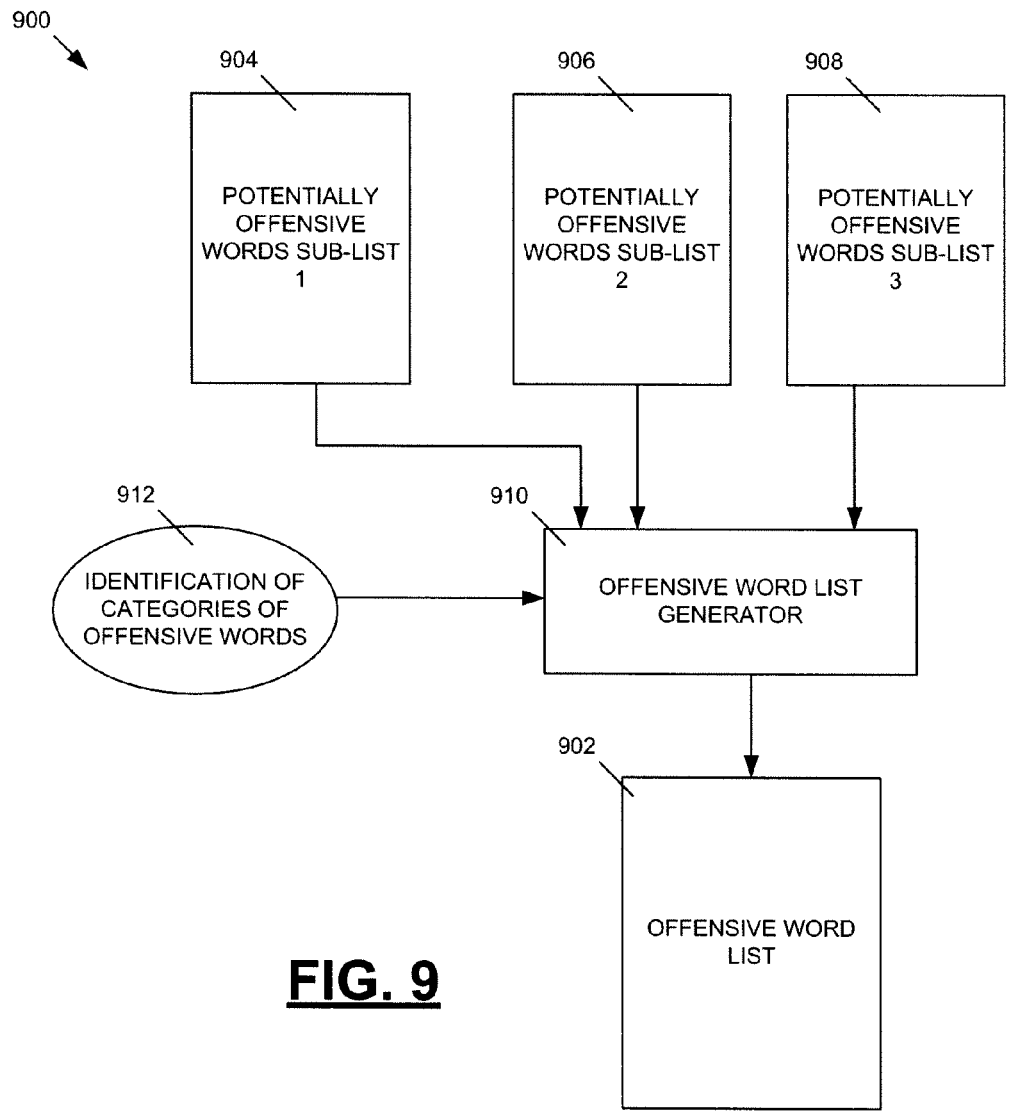
FIG. 9 is a block diagram depicting the identification of words to be included on an offensive word list.

FIG. 9 is a block diagram depicting the identification of words to be included on an offensive word list 902. As noted above, different people have different tolerances for offensive language, and different types of offensive language may affect people differently. For example, while slang terms may offend certain persons, those slang terms may be perfectly acceptable to another. To accommodate these differences, a custom offensive word list 902 may be generated. For example, offensive words may be segregated into one or more categories represented on sub-lists 904, 906, 908. For example, sub-list 1 904 may contain words that are considered racially offensive, sub-list 2 906 may contain words that are considered sexually offensive, and sub-list 3 908 may contain slang terms that are considered offensive. Offensive word list generator 910 may receive an identification of categories of words 912 that a person considers offensive. Those categories 912 that the person identifies as being offensive may be included on the offensive word list 902, while those sub-lists containing non-identified categories may not be included on the offensive word list 902.

Figure 10:
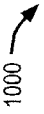
FIG. 10 is an example user interface where a user can select categories of words that the user considers offensive for generating an offensive word list and selecting an offensiveness threshold value.

FIG. 10 is an example user interface 1000 where a user can select categories of words that the user considers offensive. These selected offensive words can be used to generate an offensive word list and select an offensiveness threshold value. The example user interface 1000 includes an account preferences portion 1001. A first control at 1003 enables the selection of an option describing how tolerant of "strong language" the user is. This selection may be utilized in setting an offensiveness threshold for the user. For example, in a system using offensiveness thresholds from 0-10, a selection of "Do not allow strong language" may result in an offensiveness threshold of 1 being set for the user, a selection of "I tolerate moderate language" may result in an offensiveness threshold of 4 being set for the user, and a selection of "I am receptive to strong language" may result in an offensiveness threshold of 8 being set for the user. The account preferences 1001 also include a control for selecting what classes of strong language should be filtered at 1004. For example, control 1004 can list categories of: Swearing, Slang, Racial Slurs, Youth Oriented, Alcohol Related, Drug Related, Religion Related. Each of these categories may correspond to a sub-list as described with respect to FIG. 9. The system could also include a "user-defined" sub-for selection and population whereby a user could input words that he personally finds offensive that could be incorporated into an offensive word list. When a user saves his settings, a personalized offensive word list may be constructed that includes words from each of the sub-lists containing a category of words selected in control 1004.

Figure 11:
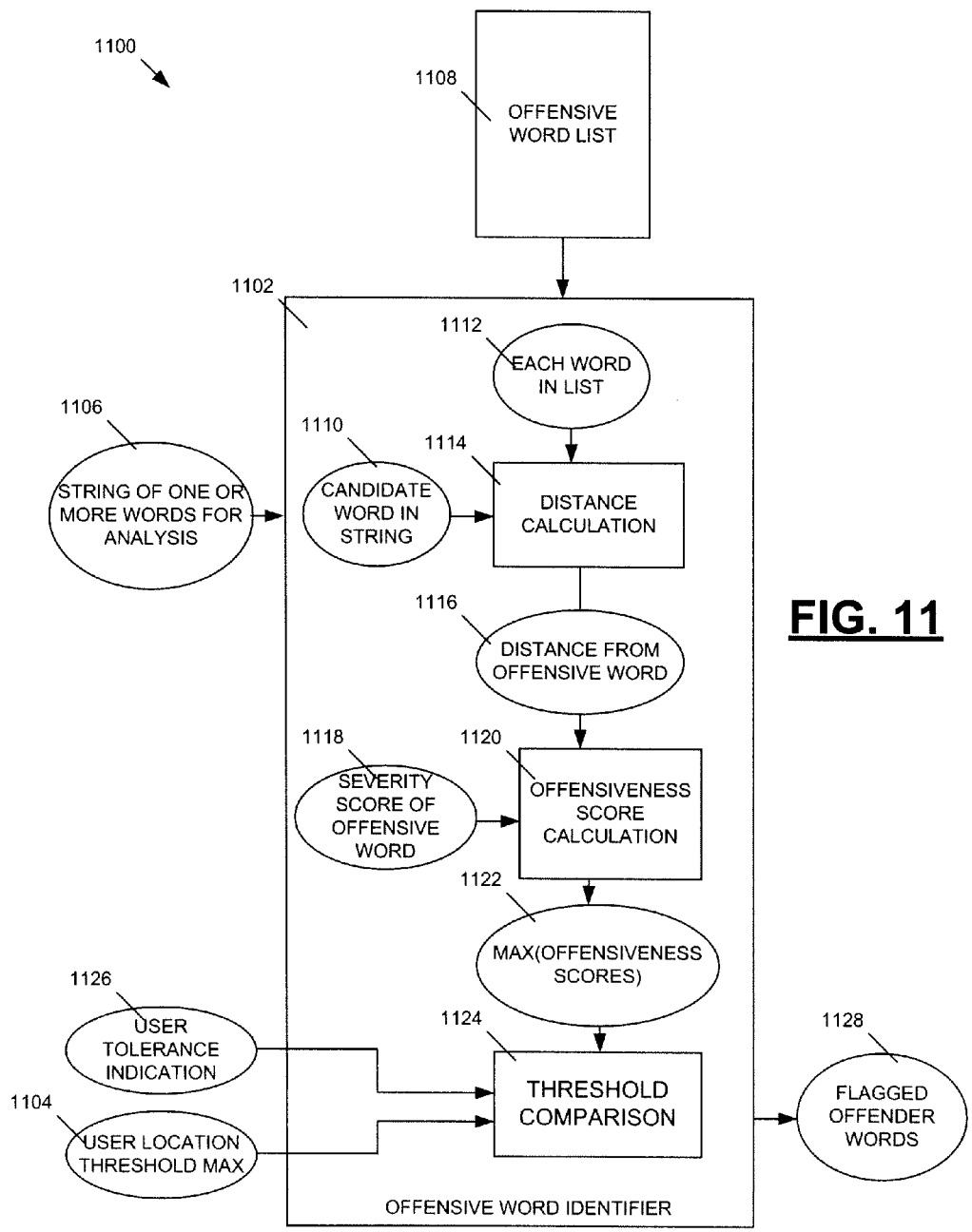
FIG. 11 is a block diagram depicting an offensive word identifier that utilizes a user location threshold maximum in setting a threshold for flagging offender words

FIG. 11 is a block diagram depicting an offensive word identifier 1102 that utilizes a user location threshold maximum 1104 in setting a threshold for flagging offender words. The offensive word filter 1102 receives a string of one or more words 1106 for analysis. The offensive word identifier 1102 is also responsive to an offensive word list 1108. A candidate word 1110 in the string of one or more words 1106 for analysis is compared to a word 1112 in the offensive word list 1108 via a distance calculation 1114. The distance of the candidate word 1110 from the word 1112 in the offensive word list 1108 is output at 1116. This output becomes an input, along with the severity score 1118 of the current word 1112 from the offensive word list 1108, to an offensiveness score calculation 1120. The maximum offensiveness score 1122 calculated at 1120 is based upon comparisons of the candidate word 1110 and each word 1112 in the offensive word list 1108. The maximum offensiveness score 1122 is compared to an offensiveness threshold at 1124. That offensiveness threshold may be set based on a user location threshold maximum 1104.

For example, in a certain country, a user location threshold maximum 1104 may be set in accordance with local standards for decency such that a person cannot set a user offensiveness tolerance greater than the user location threshold maximum 1104. In some implementations, the user may be permitted to set a more restrictive threshold than the user location threshold maximum 1104 via a user tolerance indication 1126. In another implementation, a user location threshold may be set as a default threshold for a user in that location. The user may then be free to set a higher or lower personal offensiveness threshold via a user tolerance indication 1126 (e.g., based upon the personal offensiveness tolerance of the user). If a candidate word 1110 has a maximum offensiveness score 1122 that is greater than the set threshold (e.g., at the user location), then the candidate word 1110 may be flagged as an offender word at 1128.

An offensive word identifier 1102 may also enable customized offensiveness thresholds and offensive word lists 1108 based on a user's location. For example, if a geographical region has a first offensive word list associated with the region and a user has a personal offensive word list associated with him, the offensive word identifier 1102 may utilize the union or intersection of the region offensive word list and the user offensive word list as the offensive word list 1108 in analyzing a string of one or more words. Additionally, different offensiveness thresholds may be utilized based on a user's location. For example, a lower offensiveness threshold may be utilized on a TV set-top box in a common family area, such as a living room, while a higher offensiveness threshold may be utilized on a set-top box in a parent's bedroom.

Figure 12:
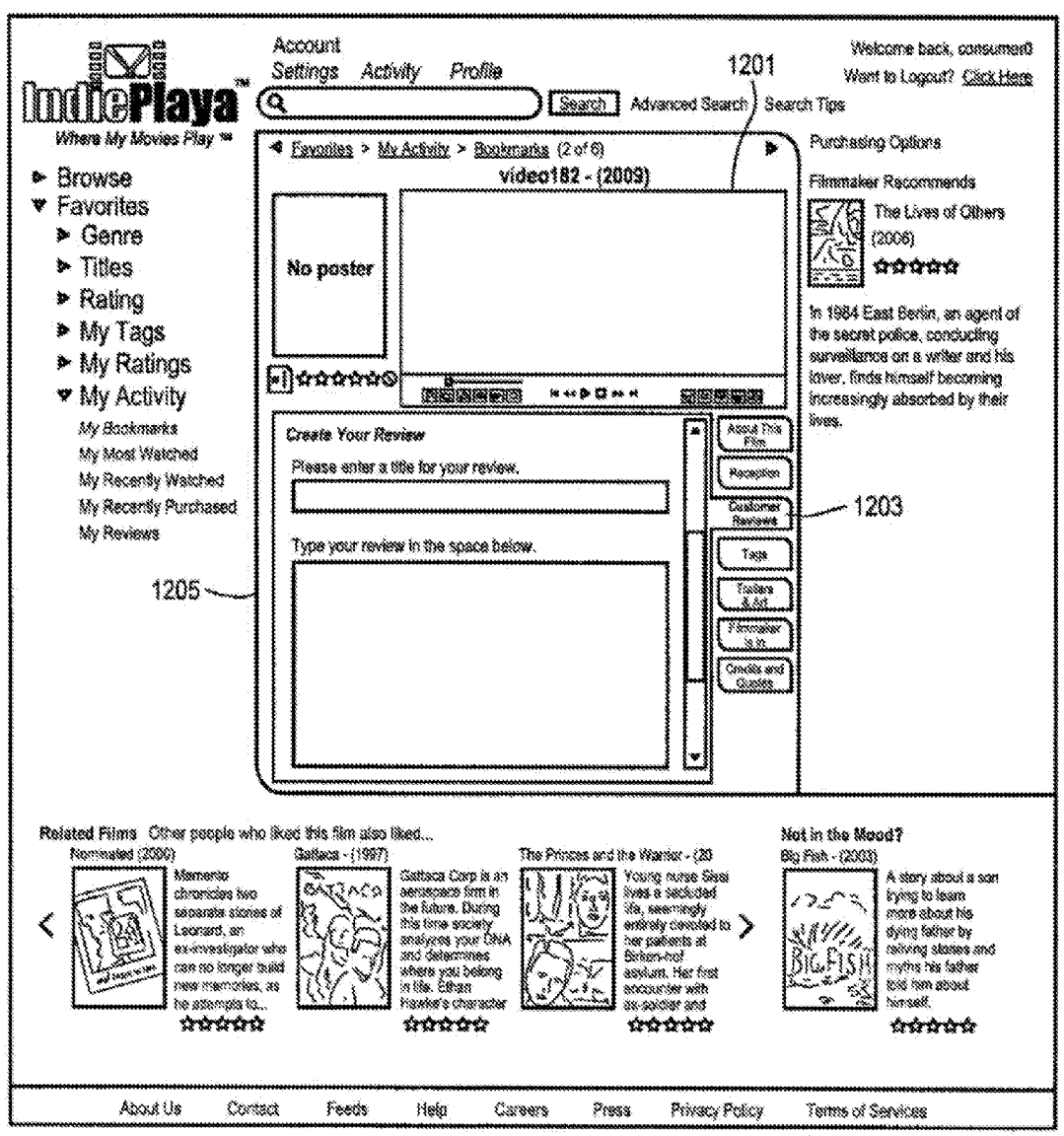
FIG. 12 depicts an example interface wherein an offensive word identifier may be utilized as an input filter.

FIG. 12 depicts an example user interface 1200 wherein an offensive word identifier may be utilized as an input filter. The user interface 1200 includes a media portal for a content review portal that includes an interface for watching video media 1201, as well as a link 1203 to a form 1205 for entering a user review of the content that is viewable in the media player interface 1201. Upon drafting and submitting a user review via the review form 1205, an offensive word identifier may review the submitted review text. If any words in the submitted review text are flagged by the offensive word identifier (e.g., the words have a calculated offensiveness score greater than the site or category offensiveness threshold identified by the proprietor of the site), then the submitted review text may be rejected or modified to mitigate the offensiveness. Additionally, the submitting user may be notified of the rejection or modification of his posting.

Figure 13:
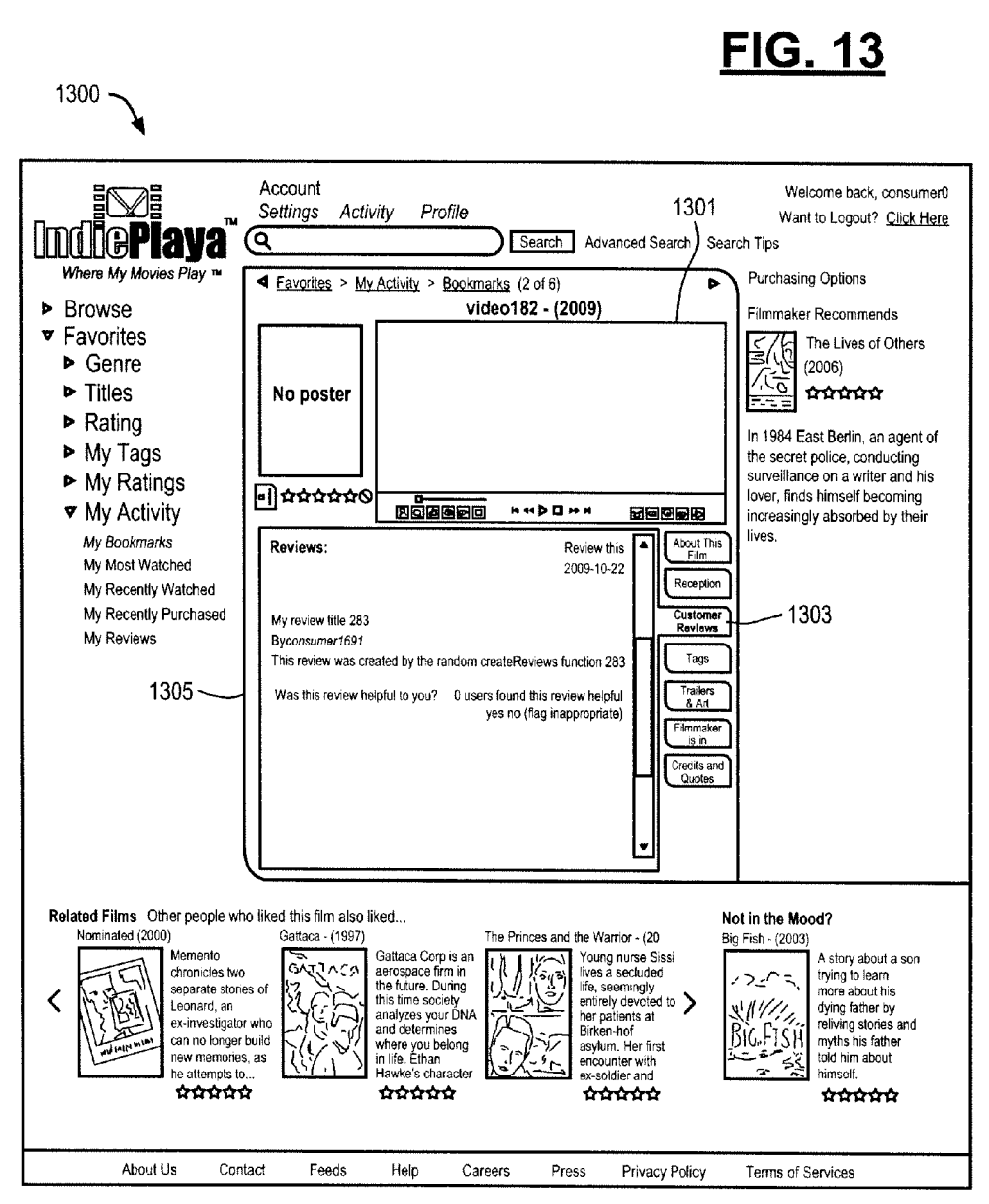

FIG. 13 depicts an example user interface 1300 wherein an offensive word identifier may be utilized as an output filter. The user interface 1300 includes a media portal that includes an interface for watching video media 1301, as well as a link 1303 to an interface 1305 for reading user reviews of the content that is viewable in the media player interface 1301. Upon selection of the link 1303 to access reviews, an offensive word identifier may review the content of the reviews to be presented to the user at 1305. If any words in the reviews to be presented are flagged by the offensive word identifier (e.g., the words have a calculated offensiveness score that identifies the words as being more offensive than the offensiveness threshold identified by the user), then those reviews may not be presented to the user. Additionally, the flagged offensive words may be censored, or other mitigation actions may be taken to minimize offending of the user.

Figure 14:
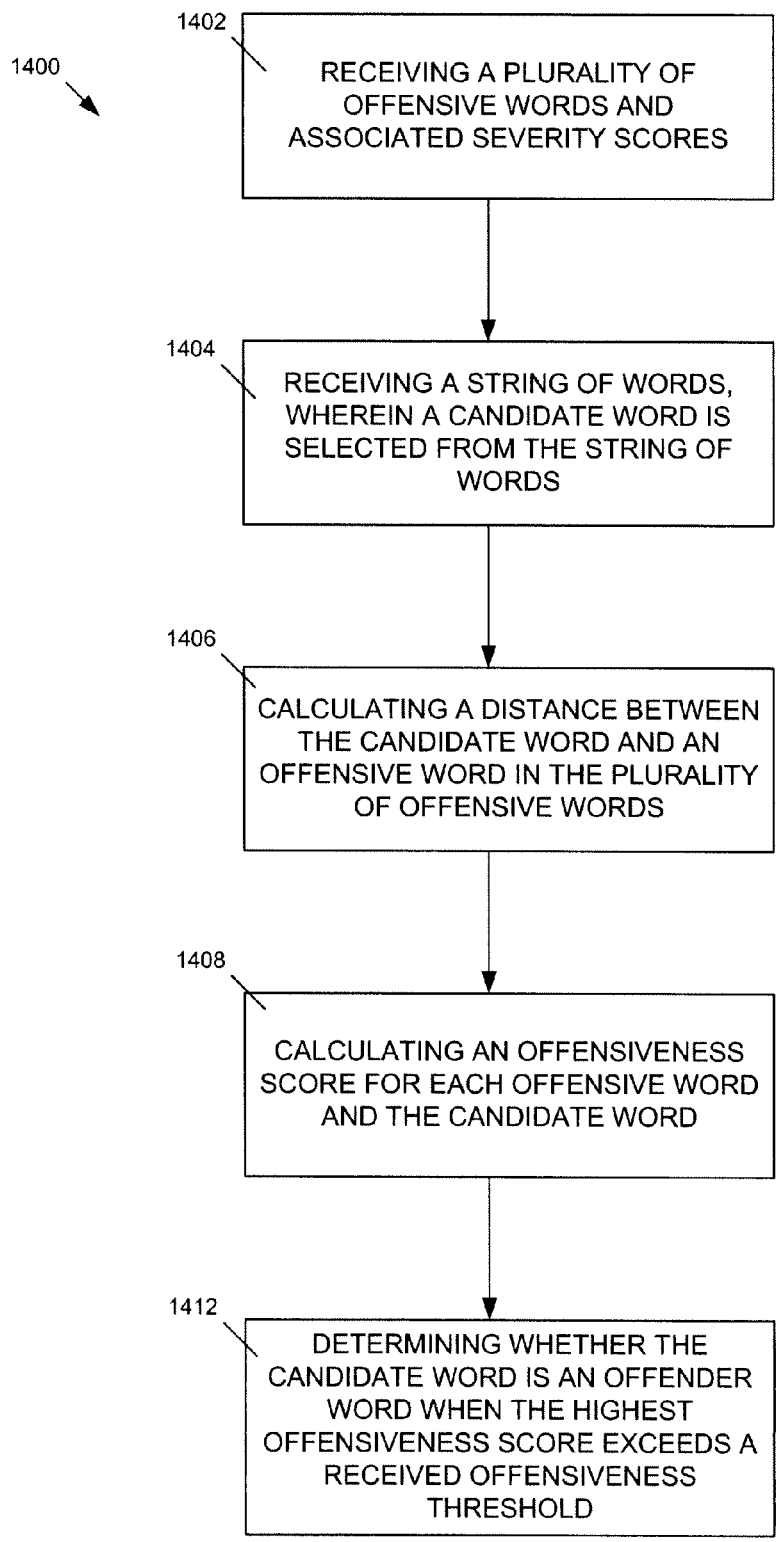
FIG. 14 is a flow diagram depicting a method of identifying offender words in a string of words.

FIG. 14 is a flow diagram depicting a method 1400 of identifying offender words in a string of words. At 1402, a plurality of offensive words are received using one or more processors, wherein each offensive word in the plurality of offensive words is associated with a severity score identifying the offensiveness of that word. At 1404, a string of words is received, wherein a candidate word is selected from the string of words, and at 1406, a distance between the candidate word and each offensive word in the plurality of offensive words is calculated. At 1408, an offensiveness score is calculated for each offensive word in the plurality of offensive words and the candidate word based upon the calculated distance and the severity score, thereby calculating a plurality of offensiveness scores. At 1412, a determination is made as to whether the candidate word is an offender word, wherein the candidate word is deemed to be an offender word when the highest offensiveness score in the plurality of offensiveness scores exceeds the offensiveness threshold value.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

In some implementations, an insider can be any third-party who exhibits an interest in one or more of the following: processing, marketing, promotion, management, packaging, merchandising, fulfillment, delivery, distribution, licensing, or enforcement of content and/or content-related data. In some implementations, an insider can be considered a content provider. A content provider is anyone who exhibits an interest in distributing, licensing, and/or sub-licensing content and/or content-related data. A content provider can include, but is not limited to, a distributor, a sub-distributor, and a licensee of content and/or content-related data. In some implementations, a content provider can perform any and all functions associated with the systems and methods provided herein. It should be understood, that any and all functions performed by a content creator can also be performed by a content provider.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed o a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the invention have been described. Other embodiments are within the scope of the following claims. For example, the actions recited in the claims can be performed in a different order and still achieve desirable results.

It is claimed:

1. A method, comprising:
   receiving, using one or more processors, a first plurality of offensive words, the first plurality of offensive words being associated with a first category of offensive words;
   receiving, using one or more processors, a second plurality of offensive words, the second plurality of offensive words being associated with a second category of offensive words;
   receiving, using one or more processors, a user preference identifying a plurality of categories of words that should be filtered, wherein the plurality of categories includes the first category and the second category;
   based on the user preference, generating, using one or more processors, a consolidated list of offensive words for the user that includes the first plurality of offensive words and the second plurality of offensive words;
   receiving, using one or more processors, a string of words, wherein one or more detected offensive words is selected from the string of words that matches words from the consolidated list that includes the first plurality of offensive words or the second plurality of offensive words; and processing the string of words, using one or more processors, based upon the detection of offensive words in the string of words.

2. The method of claim 1, wherein each word in the first plurality of words, each word in the second plurality of words and each word in the string of words comprises an abbreviation, a single word, a phrase, or a sentence.

3. The method of claim 1, wherein the first plurality of offensive words and the second plurality of offensive words are wholly unique and independent of one another, or comprise a joined subset where some words appear in both the first plurality of offensive words and the second plurality of offensive words concurrently.

4. The method of claim 1, wherein the first plurality of offensive words is provided by a first source and the second plurality of offensive words is provided by a second source, wherein the first source is different than the second source.

5. The method of claim 4, wherein the first source or the second source comprises a user, a service administrator, a third party, a government institution having jurisdictional authority for a user, a non-governmental institution with which the user is associated or any combination thereof.

6. The method of claim 1, wherein each offensive word in the first plurality of offensive words is associated with a severity score identifying offensiveness of that word;

wherein each offensive word in the second plurality of offensive words is associated with a severity score identifying offensiveness of that word;

an offensive word appearing in both the first plurality of offensive words and the second plurality of offensive words has an adjusted severity score based on the offensive word's severity score within each of the first plurality of offensive words and the second plurality of offensive words;

wherein detection of an offensive word from the string of words is based upon a greatest offensiveness scores of matching offensive words from within each plurality of offensive words; and wherein detection of an offensive word is based upon the greatest of the severity scores exceeding an offensiveness threshold value.

7. The method of claim 6, wherein the severity score of words in each plurality of offensive words is provided by a different source.

8. The method of claim 7, wherein the source of the severity scores of words in the first plurality of offensive words or the second plurality of offensive words is a user, a service administrator, a third party, a government institution having jurisdictional authority for a user, a non-governmental institution with which the user is associated, or any combination thereof.

9. The method of claim 6, wherein the greatest offensiveness score is one of:

a smallest value offensiveness score calculated in comparing each of the plurality of offensive words with a candidate word from the string of words; or a largest value offensiveness score calculated in comparing each of the plurality of offensive words with a candidate word from the string of words.

10. The method of claim 6, wherein the offensiveness threshold value is a value set by a user, a service administrator, a third party, a government institution having jurisdictional authority for a user, a non-governmental institution with which the user is associated, or any combination thereof.

11. The method of claim 6, wherein the offensiveness threshold value is derived using a function that is computed using values provided by a user, a service administrator, a third party, a government institution having jurisdictional authority over a user, a non-governmental institution with which the user is associated, or any combination thereof.

12. The method of claim 1, wherein the string of words is input from a user to a service; and the input from the user to the service is rejected if an offensive word is detected in the string of words.

13. The method of claim 1, wherein the string of words is output to a user from a service; and the output to the user is modified if an offensive word is detected in the string of words.

14. The method of claim 13, wherein modification of the output comprises one of the group consisting of:

deleting the string of words such that the string of words is not displayed to the user;

deleting the offensive word from the string of words such that the offensive words within the string of words is not displayed to the user;

censoring the string of words such that the string of words is not displayed to the user; and censoring the offensive word from the string of words such that the offensive words within the string of words is not displayed to the user.

15. The method of claim 1, wherein the string of words is input from an input user to a service and output to an output user from the service;

wherein the input from the user is rejected if an offensive word is detected that matches an offensive word within the first plurality of offensive words; and the output to the second user is modified if an offensive word is detected that matches an offensive word in within the second plurality of offensive words.

16. The method of claim 15, wherein the input user and the output user are different users or the same user.

17. A system, comprising:

a data processor;

a computer-readable memory encoded with instructions for commanding the data processor to perform steps including:

receiving a first plurality of offensive words, the first plurality of offensive words being associated with a first category of offensive words;

receiving a second plurality of offensive words, the second plurality of offensive words being associated with a second category of offensive words;

receiving a user preference identifying a plurality of categories of words that should be filtered, wherein the plurality of categories includes the first category and the second category;

based on the user preference, generating a consolidated list of offensive words for the user that includes the first plurality of offensive words and the second plurality of offensive words;

receiving a string of words, wherein one or more detected offensive words is selected from the string of words that matches words from the consolidated list that includes the first plurality of offensive words or the second plurality of offensive words; and processing the string of words based upon the detection of offensive words in the string of words.

18. The system of claim 17, wherein each word in the first plurality of words, each word in the second plurality of words and each word in the string of words comprises an abbreviation, a single word, a phrase, or a sentence.

19. The system of claim 17, wherein the first plurality of offensive words and the second plurality of offensive words are wholly unique and independent of one another, or comprise a joined subset where some words appear in both the first plurality of offensive words and the second plurality of offensive words concurrently.

20. The system of claim 17, wherein the first plurality of offensive words is provided by a first source and the second plurality of offensive words is provided by a second source, wherein the first source is different than the second source.

21. The system of claim 20, wherein the first source or the second source comprises a user, a service administrator, a third party, a government institution having jurisdictional authority for a user, a non-governmental institution with which the user is associated or any combination thereof.

22. The system of claim 17, wherein each offensive word in the first plurality of offensive words is associated with a severity score identifying offensiveness of that word;
    wherein each offensive word in the second plurality of offensive words is associated with a severity score identifying offensiveness of that word;
    an offensive word appearing in both the first plurality of offensive words and the second plurality of offensive words has an adjusted severity score based on the offensive word's severity score within each of the first plurality of offensive words and the second plurality of offensive words;
    wherein detection of an offensive word from the string of words is based upon a greatest offensiveness scores of matching offensive words from within each plurality of offensive words; and
    wherein detection of an offensive word is based upon the greatest of the severity scores exceeding an offensiveness threshold value.

23. The system of claim 22, wherein the severity score of words in each plurality of offensive words is provided by a different source.

24. The system of claim 23, wherein the source of the severity scores of words in the first plurality of offensive words or the second plurality of offensive words is a user, a service administrator, a third party, a government institution having jurisdictional authority for a user, a non-governmental institution with which the user is associated, or any combination thereof.

25. The system of claim 22, wherein the greatest offensiveness score is one of:
    a smallest value offensiveness score calculated in comparing each of the plurality of offensive words with a candidate word from the string of words; or
    a largest value offensiveness score calculated in comparing each of the plurality of offensive words with a candidate word from the string of words.

26. The system of claim 22, wherein the offensiveness threshold value is a value set by a user, a service administrator, a third party, a government institution having jurisdictional authority for a user, a non-governmental institution with which the user is associated, or any combination thereof.

27. The system of claim 22, wherein the offensiveness threshold value is derived using a function that is computed using values provided by a user, a service administrator, a third party, a government institution having jurisdictional authority over a user, a non-governmental institution with which the user is associated, or any combination thereof.

28. The system of claim 17, wherein the string of words is input from a user to a service; and
    the input from the user to the service is rejected if an offensive word is detected in the string of words.

29. The system of claim 17, wherein the string of words is output to a user from a service; and
    the output to the user is modified if an offensive word is detected in the string of words.

30. The system of claim 29, wherein modification of the output comprises one of the group consisting of:
    deleting the string of words such that the string of words is not displayed to the user;
    deleting the offensive word from the string of words such that the offensive words within the string of words is not displayed to the user;
    censoring the string of words such that the string of words is not displayed to the user; and
    censoring the offensive word from the string of words such that the offensive words within the string of words is not displayed to the user.

31. The system of claim 17, wherein the string of words is input from an input user to a service and output to an output user from the service;
    wherein the input from the user is rejected if an offensive word is detected that matches an offensive word within the first plurality of offensive words; and
    the output to the second user is modified if an offensive word is detected that matches an offensive word in within the second plurality of offensive words.

32. The system of claim 31, wherein the input user and the output user are different users or the same user.

33. A method, comprising:
    receiving, using one or more processors, a first plurality of offensive words, wherein each of the first plurality of offensive words is associated with a first offensiveness score;
    receiving, using one or more processors, a second plurality of offensive words, wherein each of the second plurality of offensive words is associated with a second offensiveness score;
    receiving, using one or more processors, a string of words, wherein a potentially offensive word is selected from the string of words that matches a word from the first plurality of offensive words or the second plurality of offensive words;
    determining an offensiveness score for the potentially offensive word, using one or more processors, based on a maximum of a first offensiveness score and a second offensiveness score for the potentially offensive word;
    processing the string of words, using one or more processors to mitigate the potentially offensive word when the offensiveness score meets an offensiveness threshold value.

34. A method, comprising:
    receiving, using one or more processors, a first plurality of offensive words, wherein each of the first plurality of offensive words is associated with a first offensiveness score;
    receiving, using one or more processors, a string of words;
    determining a distance measurement between a potentially offensive word in the string of words and an offensive word in the first plurality of offensive words, wherein the distance measurement is based on a spelling difference between the potentially offensive word and the offensive word in the first plurality of offensive words;
    determining an offensiveness score for the potentially offensive word based on the distance measurement and the first offensiveness score associated with the offensive word in the first plurality of offensive words;

processing the string of words, using one or more processors to mitigate the potentially offensive word when the offensiveness score meets an offensiveness threshold value.

35. The method of claim 34, wherein the offensiveness score is determined based on a product of the distance measurement and the first offensiveness score associated with the offensive word in the first plurality of offensive words.

* * * * *